No. 782,481. PATENTED FEB. 14, 1905.
S. BORTON.
FRICTION CLUTCH POWER TRANSMITTER.
APPLICATION FILED MAR. 23, 1903.
2 SHEETS—SHEET 1.
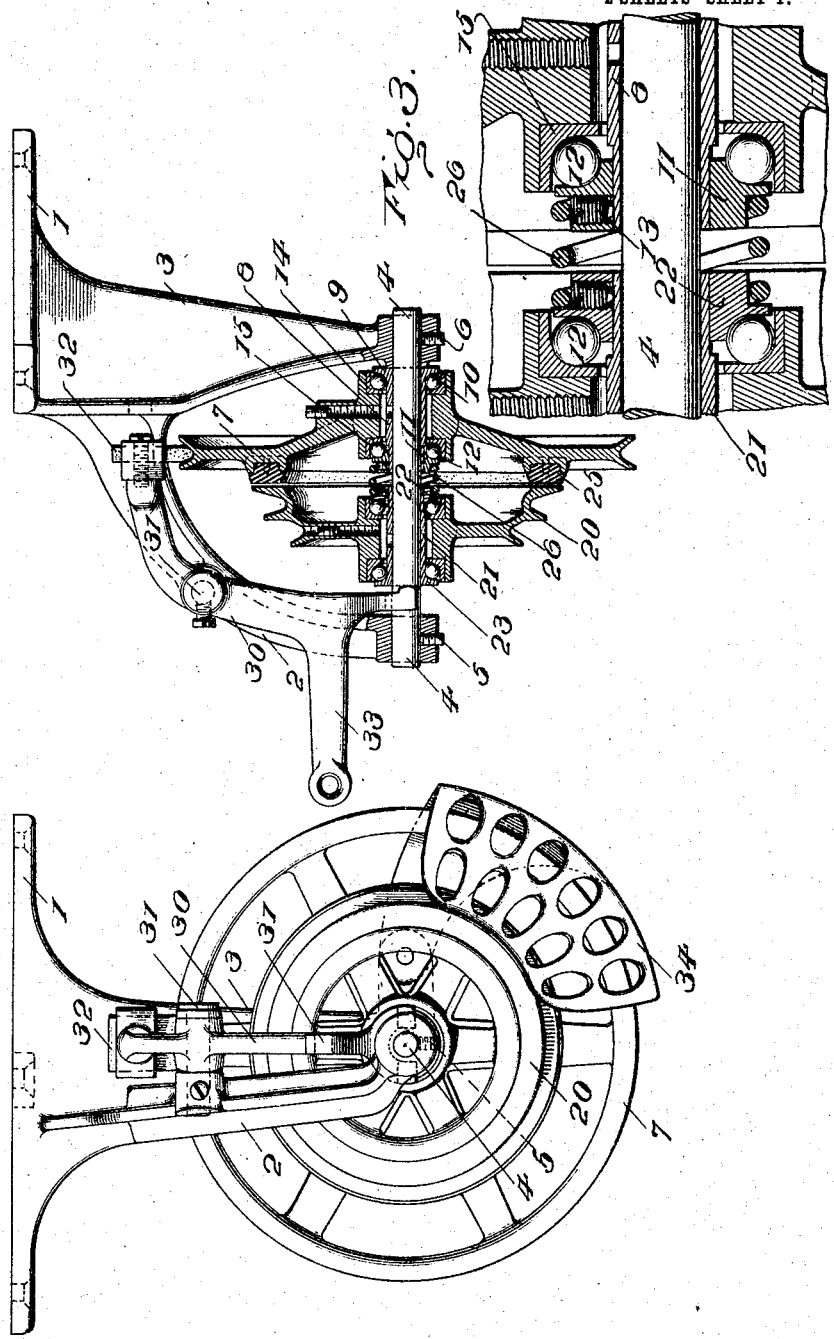
WITNESSES:
INVENTOR
Stockton Borton,
BY
Mauro, Cameron Lewis
ATTORNEYS No. 782,481. PATENTED FEB. 14, 1905.
S. BORTON.
FRICTION CLUTCH POWER TRANSMITTER.
APPLICATION FILED MAR. 23, 1903.
2 SHEETS—SHEET 2.
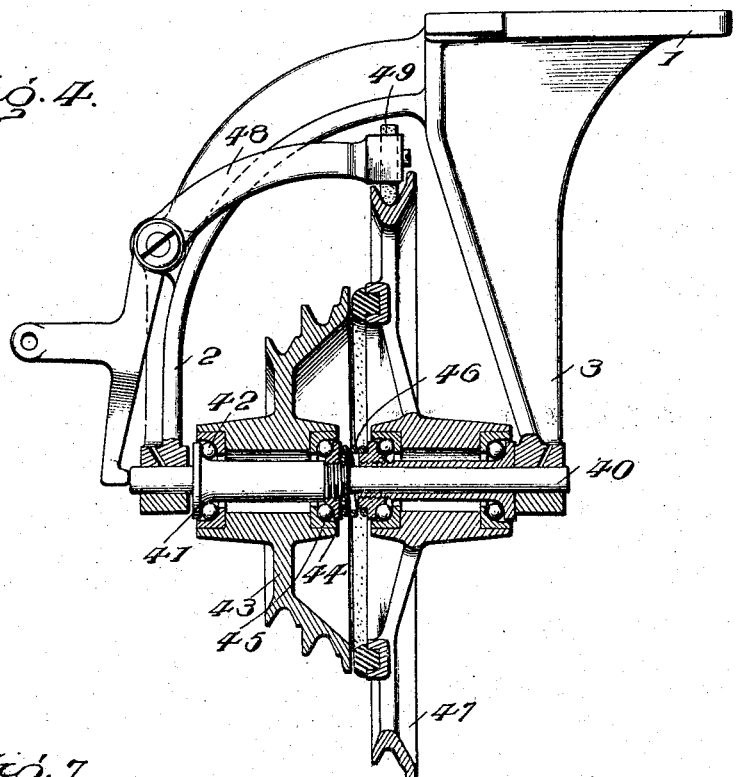
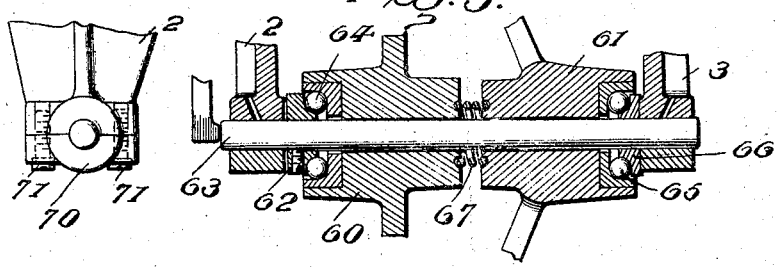
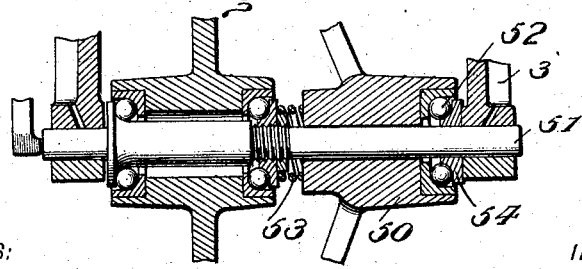
WITNESSES:
INVENTOR
Stockton Borton,
BY
Mauro, Cameron Lewis
ATTORNEYS No. 782,481.

Patented February 14, 1905.

UNITED STATES PATENT OFFICE.

STOCKTON BORTON, OF PROVIDENCE, RHODE ISLAND, ASSIGNOR TO WILLCOX & GIBBS SEWING MACHINE COMPANY, OF NEW YORK, N. Y., A CORPORATION OF NEW YORK.

FRICTION-CLUTCH POWER-TRANSMITTER.

SPECIFICATION forming part of Letters Patent No. 782,481, dated February 14, 1905.

Application filed March 23, 1903. Serial No. 149,150.

*To all whom it may concern:*

Be it known that I, STOCKTON BORTON, a resident of Providence, Rhode Island, have invented a new and useful Improvement in Friction-Clutch Power-Transmitters, which invention is fully set forth in the following specification.

My invention relates to friction-clutch power-transmitters for imparting motion from a continuously-rotating driving wheel or pulley to a driven wheel or pulley by pressing the same together with sufficient force to cause the driven pulley to rotate with the driving-pulley through frictional contact therewith, and particularly to power-transmitters of this type specially adapted for driving sewing-machines.

Great difficulty has been experienced with transmitters commonly used on sewing-machines. When pressure has been applied (usually through a treadle) to force the pulleys together to drive the machine, the friction in and through the bearings of the pulleys, due largely to end thrust and contact of the arm or lever (through which the pressure is applied) with a rotating part, has been such as to impede the rotation of both pulleys, causing slipping of the driving-belt on the driving-pulley and preventing the correct number of revolutions from being imparted to the machine. I am aware that ball-bearing power-transmitters have been devised and used with the object of obviating these difficulties.

By my present invention I overcome the difficulties above referred to and attain other advantages in construction and efficiency of operation.

The improvements constituting said invention can best be understood by reference to the accompanying drawings, showing several embodiments thereof.

Figure 1 is an elevation of the preferred embodiment. Fig. 2 is a sectional view at right angles to Fig. 1, and Fig. 3 is an enlarged detail sectional view. Figs. 4, 5, and 6 are sectional views of other embodiments, respectively; and Fig. 7 is a detail view.

Referring to Figs. 1, 2, and 3, 1 is a bracket adapted to be secured to the under side of a sewing-machine work table or bench and having depending arms 2 and 3, connected at their lower ends by a horizontal shaft 4, secured in openings therethrough by set-screws 5 and 6. The arms are thus bound together by the shaft, imparting stiffness and rigidity to the whole transmitter-frame. 7 is a driven pulley or wheel mounted on the shaft, with interposed ball-bearings, which will now be described. 8 is a sleeve fitting closely on the shaft, having at one end a coned head or flange 9, with a concave inner face against which a set of balls 10 bear. At its other end the sleeve is reduced in diameter to receive a collar 11, constituting a flange or head on the sleeve, and having a coned or concave surface against which a set of balls 12 bear. The collar is secured in proper position on sleeve 8 by one or more set-screws 13. 14 and 15 are bearing-rings secured in opposite ends of the hub of pulley 7, the former bearing against balls 10 and the latter against balls 12. A driving pulley or wheel 20 has exactly similar bearings, except that the position of the sleeve 21 (corresponding to sleeve 8) is reversed, bringing the flanged or coned end 23 at its outer end and the collar 22 at its inner end opposite the corresponding collar 11 of the other sleeve. 25 is a ring of leather or similar material, secured to pulley 7. A flat surface on the inner face of pulley 20 contacts therewith when the pulleys are pressed together against the tension of a spiral spring 26, surrounding shaft 4 between the pulleys and bearing at its opposite ends against collars 11 and 22, respectively. A lever 30, fulcrumed to bracket-arm 2 at 31, carries at one end a friction-block 32, adapted to bear in the peripheral groove of driven pulley 7 to stop the machine when the pulleys are separated. At its other end said lever is forked around shaft 4, so as to bear against the flanged or coned end 23 of sleeve 21 of the bearings of the driving-pulley 20 for moving said bearings and pulley longitudinally on shaft 4 to compress spring 26 and press the pulleys together to impart movement to the driven pulley 7. A treadle or other suitable operating means may be connected to an arm 33 on lever 30. 34, Fig. 1, is a dress-guard.

It will be understood from the above description that immediately upon release of downward pressure upon arm 33 the spring 26 exerts its tension on the bearings of pulley 20 to move said bearings and pulley along shaft 4, (to the left, Fig. 2,) quickly throwing the two pulleys out of frictional engagement upon release of the pressure upon arm 33 and simultaneously tilting lever 30 on its pivot and bringing brake-block 32 into contact with driven pulley 7, thereby arresting rotary movement of the same and of the machine to which it is belted. The spring therefore performs the double function of moving the pulleys apart and of applying the brake. It is also important to note that the lever in moving the pulleys together does not bear against the hub of the pulley 20 nor against other rotating part which might produce such friction and resistance to the rotation of the pulleys as to cause slipping of the belts thereon, and thus prevent the desired number of rotations from being imparted to the machine, but bears against the end of the non-rotating sleeve 21 of the bearings of pulley 20. Furthermore, the end thrust falls entirely upon the ball-bearings, so that no excessive friction can be produced therefrom.

The embodiment of the invention shown in Fig. 4 is the same as that of Figs. 1, 2, and 3 except in the following respects: The shaft 40, which is free to have a slight longitudinal movement in the arms 2 and 3, has at one end an integrally-formed flange 41, having a coned or concave inner face against which a set of bearing-balls 42 for driving-pulley 43 bear. A second set of balls for said pulley bear against the inner coned or concaved face of a collar 44, screw-threaded onto shaft 40 near its middle. Spring 46 bears at one end against collar 44, imparting longitudinal movement to the shaft and pulley 43, withdrawing the latter from contact with driven pulley 47, and simultaneously operating lever 48, which bears against the end of the shaft to apply the brake-block 49 to pulley 47.

The embodiment of the invention shown in Fig. 6 is the same as that of Fig. 4, except that the driven pulley 50 bears directly on the shaft 51 and has ball-bearings 52 at one end only serving to receive the end thrust when the pulleys are forced together. The balls bear against a collar 54 on the shaft. The spring 53 bears at one end against the hub of pulley 50.

In the embodiment of Fig. 5 both pulleys 60 and 61 bear directly upon the shaft, the movement for pressing the pulleys into frictional engagement being transmitted to pulley 60 through a collar 62 on shaft 63 and bearing-balls 64, working in the outer end of said pulley. Ball-bearings 65, operating against a collar 66 on the shaft, receive the end thrust in that direction. Spring 67 bears at opposite ends against the inner ends of the pulley-hubs.

In the arrangements shown in Figs. 4, 5, and 6 in order to get the shaft and pulleys into place between the arms of the frame it is necessary to provide bearing-block 70, Fig. 7, removably secured to the lower end of one or both arms by screws 71.

What I claim is—

1. In a friction-clutch power-transmitter, a driven pulley or wheel, a driving pulley or wheel for imparting rotary movement to the driven pulley by frictional contact therewith, bearings for the pulleys comprising a non-rotating shaft and antifriction-balls or analogous means interposed between the shaft and pulleys, a lever adapted to bear at one end against a non-rotating part of the bearings of one pulley to force the pulleys into frictional contact and at its other end to make contact with the driven pulley and act as a brake therefor, and a spring exerting its tension to force the pulleys out of frictional contact and the lever into braking contact with the driven pulley.

2. In a friction-clutch power-transmitter, a driven pulley or wheel, a driving pulley or wheel for imparting rotary movement to the driven pulley by frictional contact therewith, bearings for the pulleys comprising a non-rotating shaft and antifriction-balls or analogous means interposed between the shaft and pulleys, a lever adapted to bear at one end against a non-rotating part of the bearings of one pulley to force the pulleys into frictional contact and at its other end to make contact with the driven pulley and act as a brake therefor, and a spring between the pulleys bearing against non-rotating parts of the bearings of each pulley and exerting its tension to force the pulleys out of frictional contact and the lever into braking contact with the driven pulley.

3. In a friction-clutch power-transmitter, a driven pulley or wheel, a driving pulley or wheel for imparting rotary movement to the driven pulley by frictional contact therewith, bearings for the pulleys comprising a non-rotating shaft and antifriction-balls entirely supporting each pulley upon the shaft, and a lever engaging a non-rotating part of the bearings and acting through the antifriction-balls of one pulley to press the same into frictional contact with the other pulley.

4. In a friction-clutch power-transmitter, a driven pulley or wheel, a driving pulley or wheel for imparting rotary movement to the driven pulley by frictional contact therewith, bearings for the pulleys comprising a non-rotating shaft, antifriction-balls entirely supporting each pulley upon the shaft, and a flanged sleeve free to move longitudinally on the shaft and against which the balls for one pulley bear, and a lever engaging a non-rotating part of the bearings and acting through the antifriction-balls of one pulley to press the same into contact with the other pulley.

5. In a friction-clutch power-transmitter, a driven pulley or wheel, a driving pulley or wheel for imparting rotary movement to the driven pulley by frictional contact therewith, bearings for the pulleys comprising a non-rotating shaft, antifriction-balls entirely supporting each pulley upon the shaft, the pulleys and their balls being relatively axially movable to bring the pulleys into frictional contact, a spring acting upon non-rotating parts of the bearings to move the pulleys out of frictional contact, and a lever bearing upon a non-rotating part of the bearings to press the pulleys into frictional contact against the pressure of said spring.

6. In a friction-clutch power-transmitter, a driven pulley or wheel, a driving pulley or wheel for imparting rotary motion to the driven pulley by frictional contact therewith, a shaft on which the pulleys are mounted, a sleeve on the shaft for each pulley, bearing-balls supporting each pulley on its sleeve, and a lever adapted to bear upon one sleeve to move its pulley along the shaft into frictional contact with the other pulley.

7. In a friction-clutch power-transmitter, a driven pulley or wheel, a driving pulley or wheel for imparting rotary motion to the driven pulley by frictional contact therewith, a shaft on which the pulleys are mounted, a sleeve on the shaft for each pulley, bearing-balls supporting each pulley on its sleeve, a spring bearing against the sleeves, and a lever bearing against one sleeve to move its pulley along the shaft against the tension of the spring and into frictional contact with the other pulley.

8. In a friction-clutch power-transmitter, a driven pulley or wheel, a driving pulley or wheel for imparting rotary motion to the driven pulley by frictional contact therewith, a shaft on which the pulleys are mounted, a sleeve on the shaft for each pulley, bearing-balls supporting each pulley on its sleeve, a spring bearing against the inner ends of the sleeves, and a lever bearing at one end against the outer end of one sleeve to move its pulley along the shaft against the tension of the spring and into frictional contact with the other pulley and at its other end adapted to be pressed against the driven pulley by the action of the spring in moving the pulleys out of frictional contact.

9. In a friction-clutch power-transmitter, a driven pulley or wheel, a driving pulley or wheel for imparting rotary motion to the driven pulley by frictional contact therewith, a shaft on which the pulleys are mounted, a sleeve on the shaft for each pulley each sleeve having an integrally-formed flange at one end and a removable collar constituting a flange at its other end, two sets of bearing-balls supporting each pulley on its sleeve and operating respectively against the inner faces of the flanges at opposite ends of the sleeve, and a lever adapted to bear upon the outer end of one sleeve to move its pulley along the shaft into frictional contact with the other pulley.

10. In a friction-clutch power-transmitter, a two-armed bracket, a driven pulley or wheel, a driving pulley or wheel for imparting rotary motion to the driven pulley by frictional contact therewith, a shaft rigidly connecting the ends of the arms and on which the pulleys are mounted between the arms, a sleeve on the shaft for each pulley, bearing-balls supporting each pulley on its sleeve, a spring bearing against the inner ends of the sleeves, and a lever fulcrumed to one arm of the bracket and bearing at one end against the outer end of one sleeve to move its pulley along the shaft against the tension of the spring and into frictional contact with the other pulley and the other end of said lever being adapted to be pressed against the driven pulley by the action of the spring in moving the pulleys out of frictional contact.

In testimony whereof I have signed this specification in the presence of two subscribing witnesses.

STOCKTON BORTON.

Witnesses:
 JOHN A. KING,
 ALICE M. HENTZ.